(12) United States Patent
Arnold et al.

(10) Patent No.: US 11,312,151 B2
(45) Date of Patent: Apr. 26, 2022

(54) FLUID EXTRACTION USING FILL PUMP ACTIVATION

(71) Applicant: Hewlett-Packard Development Company, L.P., Spring, TX (US)

(72) Inventors: Christopher John Arnold, Vancouver, WA (US); Paul Allan Osborne, Vancouver, WA (US); Devin Michael Knowles, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/276,930

(22) PCT Filed: Dec. 4, 2018

(86) PCT No.: PCT/US2018/063882
§ 371 (c)(1),
(2) Date: Mar. 17, 2021

(87) PCT Pub. No.: WO2020/117213
PCT Pub. Date: Jun. 11, 2020

(65) Prior Publication Data
US 2022/0032644 A1 Feb. 3, 2022

(51) Int. Cl.
*B41J 2/18* (2006.01)
*B41J 2/175* (2006.01)
(52) U.S. Cl.
CPC ............ *B41J 2/18* (2013.01); *B41J 2/17596* (2013.01)

(58) Field of Classification Search
CPC ........ B41J 2/18; B41J 2/17596; B41J 2/1752; B41J 2/1755; B41J 2/17566; B41J 2/17513; B41J 2/17506; B41J 2002/17589
See application file for complete search history.

(56) References Cited

U.S. PATENT DOCUMENTS

| | | | |
|---|---|---|---|
| 5,291,215 A | 3/1994 | Nozawa et al. | |
| 6,231,174 B1 | 5/2001 | Haigo | |
| 6,454,381 B1 | 9/2002 | Olsen et al. | |
| 6,789,883 B2 * | 9/2004 | Heim | B41J 2/17506 347/85 |
| 6,945,640 B2 * | 9/2005 | Cheok | B41J 2/17506 347/85 |

(Continued)

FOREIGN PATENT DOCUMENTS

| WO | WO-2005070680 A1 | 8/2005 |
|---|---|---|
| WO | WO-2010118225 A1 | 10/2010 |
| WO | WO-2010130221 A1 | 11/2010 |

*Primary Examiner* — An H Do
(74) *Attorney, Agent, or Firm* — HP Inc. Patent Department

(57) ABSTRACT

In one example in accordance with the present disclosure, a fluid extraction system is described. The fluid extraction system includes an interface to fluidically and electrically couple a removable extraction reservoir to a printing device. A supply line of the fluid extraction system transports fluid from the interface to a reservoir of the printing device. A return line of the fluid extraction system is coupled to the reservoir and supply line and transports fluid from the reservoir to the interface. The fluid extraction system also includes a switch to, responsive to removal of the removable extraction reservoir from the printing device, activate a fill pump to draw fluid through the supply line away from the interface.

15 Claims, 9 Drawing Sheets

(56) References Cited

U.S. PATENT DOCUMENTS

| | | | |
|---|---|---|---|
| 8,033,657 B2 | 10/2011 | Sasaki | |
| 8,057,006 B2 * | 11/2011 | Rice | B41J 2/17546 |
| | | | 347/14 |
| 8,500,240 B2 | 8/2013 | Matsubara et al. | |
| 8,567,895 B2 | 10/2013 | Furukawa et al. | |
| 8,960,868 B1 | 2/2015 | Turgeman | |

* cited by examiner

FLUID EXTRACTION USING FILL PUMP ACTIVATION

BACKGROUND

Printing devices operate to dispense a fluid onto a substrate surface. For example, a printer may operate to dispense fluid such as ink onto a surface such as paper in a predetermined pattern. In another example, an additive manufacturing fluid is dispensed as part of an additive manufacturing operation. The fluid is supplied to such printing devices from a reservoir or other supply. That is, a reservoir holds a volume of fluid that is passed to the printing device and ultimately deposited on a surface.

BRIEF DESCRIPTION OF THE DRAWINGS

The accompanying drawings illustrate various examples of the principles described herein and are part of the specification. The illustrated examples are provided for illustration, and do not limit the scope of the claims.

Figure 1:
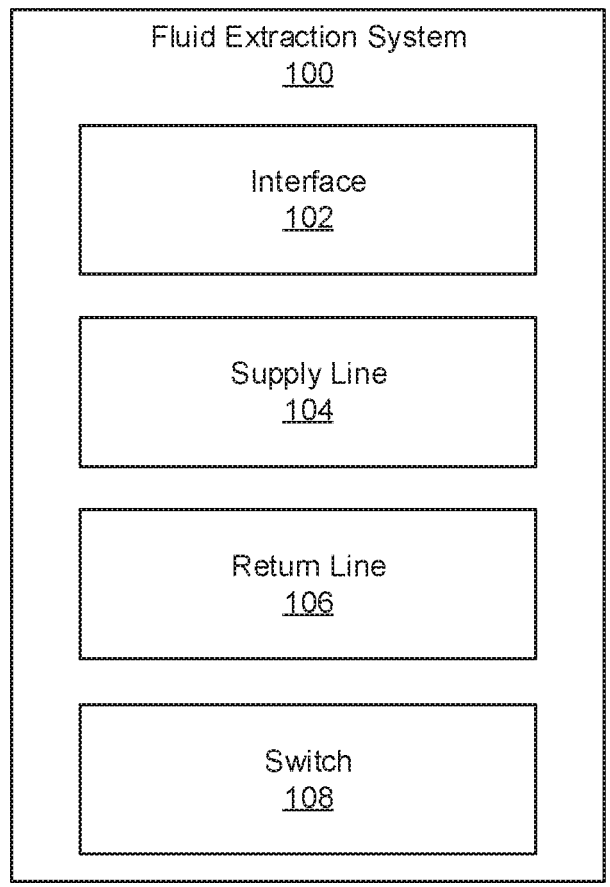
FIG. 1 is a block diagram of a fluid extraction system for fluid extraction using fill pump activation, according to an example of the principles described herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Fluid such as ink in a printer or additive manufacturing liquid in a 3D printer, is deposited on a surface from a printing device. Fluid is supplied via a reservoir that holds the fluid to be ejected. In some examples, e.g., a continuous fluid system, a reservoir is internal to the printer. Over time as the fluid is depleted from the reservoir it may be refilled or topped off.

While such printers with continuous fluid systems may be beneficial, certain situations could benefit from additional operation. In some cases, for example, printing devices with continuous fluid systems may be used under a contract in which the print fluid, such as ink, is supplied under terms of the contract. However, if a printing device reaches an end of the contract date with fluid still remaining in the reservoir, a fluid supplier may wish to extract the fluid from the reservoir. For example, in cases in which the printing device is to be returned to the supplier at the end of the contract, the fluid supplier may have an interest in extracting fluid from the reservoir prior to the printing device being returned to the printing device supplier, such as to avoid potential fluid spills during transport. In cases in which the device has been purchased by the end user, the fluid supplier may have an interest in extracting fluid from the reservoir at the end of the contract, such as to avoid having the end user use contractual fluid without payment and/or while not under contract. In another example, the printing device may have a malfunction which is too costly to repair such that the printing device is to be removed from operation. In this example the fluid supplier again may wish to extract the fluid from the reservoir prior to disposal of the printing device.

Other examples of when it may be desirable to remove fluid such as ink from a reservoir include long term storage of the printing device and/or transportation of the printing device. In either scenario, leaving the ink in the reservoir may be undesirable as pigments may settle and cause blockage in a delivery system, the ink may dry out during long term storage, and/or the ink may spill during the jostling that generally accompanies transportation.

As yet another example, it may be desirable to remove ink from a reservoir during a service, repair, and/or replacement event of that particular reservoir, another reservoir, or a module in which the reservoirs are disposed.

Accordingly, the present specification describes a fluid extraction operation wherein fluid in a reservoir can be extracted in a secure fashion while maintaining the integrity of the fluid disposed therein. That is, the fluid is not exposed to environmental contamination and can be recycled for use in other printing devices.

While such a fluid extraction operation results in the efficient management of fluid supplies, some characteristics may complicate the fluid extraction process. For example, during an extraction operation, fluid is pulled from a reservoir through a return line to a removable extraction reservoir. Following extraction, after the removable extraction reservoir has been removed, pressure differentials and other environmental conditions may cause an amount of fluid to continue to be drawn from the reservoir, even though the extraction reservoir is not in place. Accordingly, fluid may flow through the return line, but instead of being deposited in the extraction reservoir, this fluid may spill out over the printing device and/or the user.

In another example, a user may remove the extraction reservoir before the extraction operation is complete. That is, the user may remove the extraction reservoir before the pump stops running. This similarly may result in spillage on the printing device and/or the user. Other sources of leakage may also be present.

Accordingly, the present specification describes a fluid extraction system that prevents leakage. Specifically, the present specification describes a system that includes a switch in the interface where the removable extraction reservoir is received in the printing device. The switch is toggled upon the insertion and removal of the removable extraction reservoir. Specifically, when engaged, i.e., when a removable extraction reservoir is in place, the switch is in a first position. While in this position, fluid is extracted from the reservoir via a return line running from the reservoir to the removable extractor reservoir. When the removable extraction reservoir is removed, the switch changes position. This change in position triggers activation of a fill pump which draws the fluid away from the interface/removable extraction reservoir back to the printing device reservoir. Thus, the present specification prevents the spillage of fluid when a removable extraction reservoir is not in place.

Specifically, the present specification describes a fluid extraction system. The system includes an interface to fluidically and electrically couple a removable extraction reservoir to a printing device. A supply line of the fluid extraction system transports fluid from the interface to a reservoir of the printing device. A return line of the fluid extraction system is coupled to the reservoir and the supply line and transports fluid from the reservoir to the interface. A switch of the fluid extraction system, responsive to removal of the removable extraction reservoir from the printing device activates a fill pump to draw fluid through the supply line, but away from the interface.

The present specification also describes a fluid transport system. The fluid transport system includes a reservoir to hold an amount of fluid, an interface to fluidically couple a removable extraction reservoir to a printing device, and a supply line to connect the interface and the reservoir. A fill pump draws fluid to the reservoir. A return line of the fluid transport system connects the reservoir to the supply line between the interface and the fill pump, and transports fluid from the reservoir to the interface. A return line valve is disposed along the return line to open and close the return line. A switch of the fluid transport system, responsive to removal of the removable extraction reservoir from the printing device, activates the fill pump to draw fluid through the supply line away from the interface. The fluid transport system also includes a recirculation pump to, during an extraction operation, move fluid from the reservoir to the interface.

The present specification also describes a method. According to the method, a removable extraction reservoir is received at an interface of a printing device. Fluid is then extracted from the reservoir to the removable extraction reservoir. Then responsive to the removal of the removable extraction reservoir from the interface, a fill pump is activated to draw fluid through the supply line away from the removable extraction reservoir.

Such a fluid extraction system may 1) prevent disposal of otherwise usable fluid disposed within an out-of-contract/non-functioning printing device; 2) reduce financial exposure for fluid suppliers as they can reclaim fluid dispensed in an out-of-contract/non-functioning printing device; 3) prevent printing device failure due to ink drying out during long term storage; 4) reduce service cost and complexity; 5) prevent re-fill with unauthorized fluid; 6) allow printing device recyclability without fluid in reservoir; 7) enable extraction from a single reservoir; 8) enable secure reclamation and refilling of ink; and 9) prevents fluid spillage during/after fluid extraction due to removal of a removable extraction reservoir.

Figure 2:
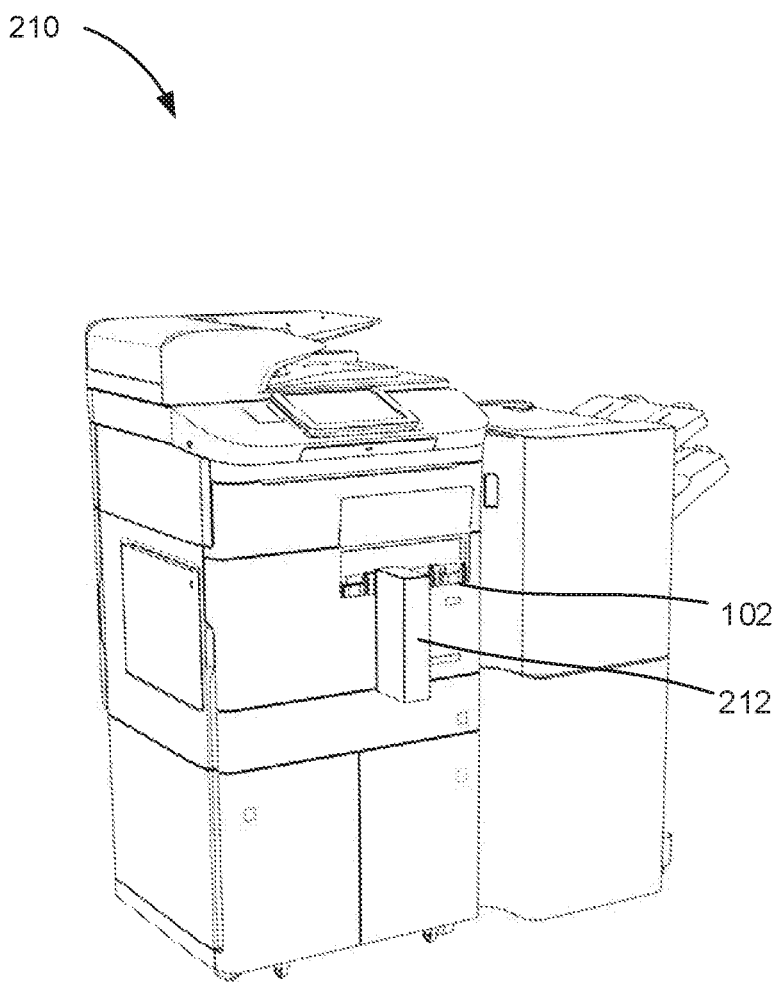
FIG. 2 is an isometric view of a printing device with a fluid extraction system for fluid extraction using fill pump activation, according to an example of the principles described herein.

Turning now to the figures, FIG. 1 is a block diagram of a fluid extraction system (100) for fluid extraction using fill pump activation, according to an example of the principles described herein. Specifically, FIG. 1 is a block diagram of a closed-loop fluid extraction system (100) which extracts fluid, such as ink, in a manner that preserves fluid integrity so that it may be used to fill the same, or different, printers in the future. The fluid extraction system (100) may be disposed in a printing device as depicted in FIG. 2. In this example, the fluid that is extracted is ink. In other examples, the fluid that is extracted may be other than ink. For example, the fluid may be a fusing agent used in an additive manufacturing operation.

The fluid extraction system (100) includes an interface (102). The interface (102) receives a removable extraction reservoir and fluidically and electrically couples the removable extraction reservoir to a printing device in which the fluid extraction system (100) is disposed. That is, the interface (102) may have a needle that pierces a septum of the removable extraction reservoir to allow fluid to flow between the removable extraction reservoir and the internal reservoir of the printing device. Other types of fluid interfaces may also be used, other than a needle that pierces a septum.

The interface (102) may also have an electrical connection that mates with an electrical connection of the removable extraction reservoir. Via the mating of these two electrical connections, a data transmission path is established. The data transmission path facilitates the transmission of various pieces of data. For example, a memory device on the removable extraction reservoir may indicate characteristics of the removable extraction reservoir and/or characteristics of the fluid contained therein. This information may be used during a refill and/or extraction process. For example, the information may indicate whether the reservoir is an extraction reservoir that is empty or a refill reservoir that is full. That is, an extraction reservoir may be empty and may be intended to receive fluid from the reservoir during an extraction operation. By comparison, a refill reservoir may be full and may be intended to deliver fluid to the reservoir. Accordingly, this information may gate what operation, i.e., refill or extraction, is carried out.

Other examples of information may include a capacity of the removable extraction reservoir. Accordingly, a fluid extraction process may be terminated when a quantity of fluid extracted matches the capacity of the removable extraction reservoir. Further, the data may include an amount of fluid already disposed in the removable extraction reservoir. Again, this may be used to terminate fluidic extraction when the capacity less the amount of fluid disposed in the extraction reservoir is reached. In another example, the amount of fluid disposed within the removable extraction reservoir may be used during a re-fill operation wherein fluid is passed from the extraction reservoir to an internal reservoir of the printing device. Accordingly, the refill operation may be terminated when the quantity of fluid passed to the reservoir from the extraction reservoir reaches the amount of fluid disposed in the extraction reservoir.

As yet another example, the data may indicate a type of fluid, for example a type of ink. The type of ink or the type of fluid may affect various parameters of the extraction operation such as whether extraction is permissible, an extraction rate, and/or an extraction amount. Other parameters may also be affected.

While particular reference is made to a few pieces of data that are included in the memory device, that are transferred through the interface (102), and that control fluidic extraction, other pieces of data may also be transferred and used.

The fluid extraction system (100) also includes a supply line (104) through which fluid is supplied to the reservoir. That is, in addition to the extraction operations described herein, the fluid extraction system (100), or components therein, may be used during other fluid transport operations such as a refill operation. During a refill operation, fluid is passed to the reservoir from the replaceable extraction reservoir. This fluid is passed via a supply line (104) that is coupled to the interface (102) and also to the reservoir where the fluid will ultimately reside. As will be described below, this supply line (104), or a portion thereof, is utilized during an extraction operation. A fill pump may be disposed along the supply line (104). This fill pump draws fluid from the removable extraction reservoir to the reservoir through the supply line (104).

The fluid extraction system (100) also includes a return line (106). The return line (106) is the path by which fluid is removed from the reservoir to the replaceable extraction reservoir during an extraction operation. For example, the return line (106) may be coupled to the reservoir and to the interface (102) where the removable extraction reservoir is to be attached. Upon initialization of the extraction operation, fluid is pulled from the reservoir, through the return line (106) and from there into the removable extraction reservoir.

The fluid extraction system (100) also includes a switch (108). The switch (108) operates to obstruct the fluid path from the reservoir to the removable extraction reservoir. The fluid path may be obstructed when it is desired that fluid not flow towards the removable extraction reservoir. For example, a user may remove the removable extraction reservoir prior to completion, or at the completion, of an extraction operation, but before the recirculation pump which drives the fluid through the return line (106) has shut off. If the recirculation pump is active while the removable extraction reservoir is not attached, fluid may spill out into the printing device and/or over the user. Consequently, in this scenario it may be desirable to prevent fluid flow to the interface (102).

Figure 3A:
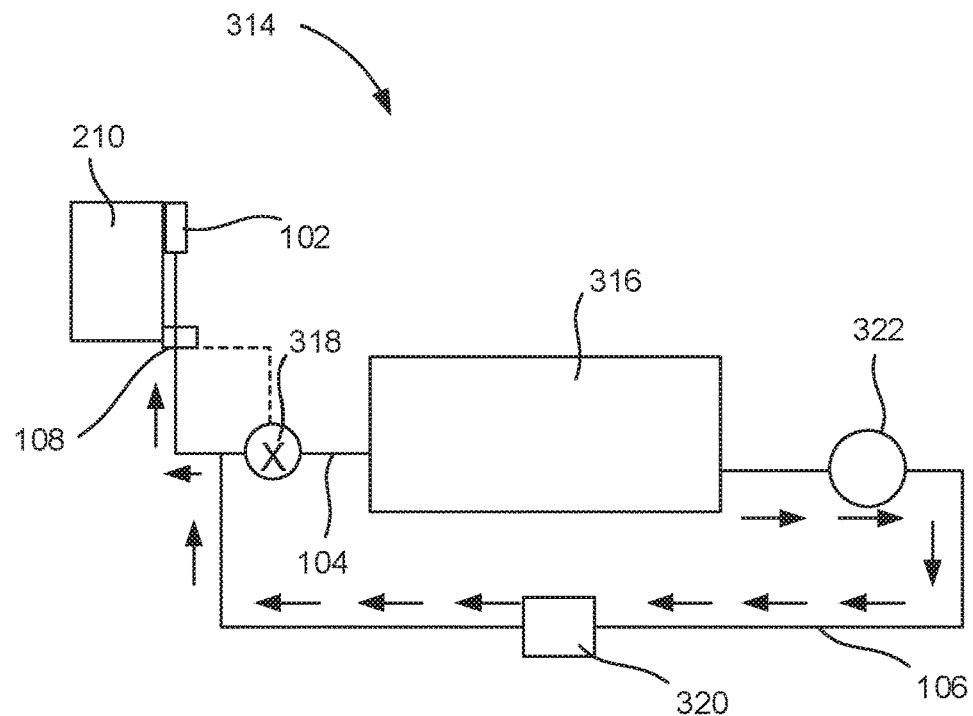
FIGS. 3A and 3B are diagrams of a fluid transport system for fluid extraction using fill pump activation, according to an example of the principles described herein.
Figure 3B:
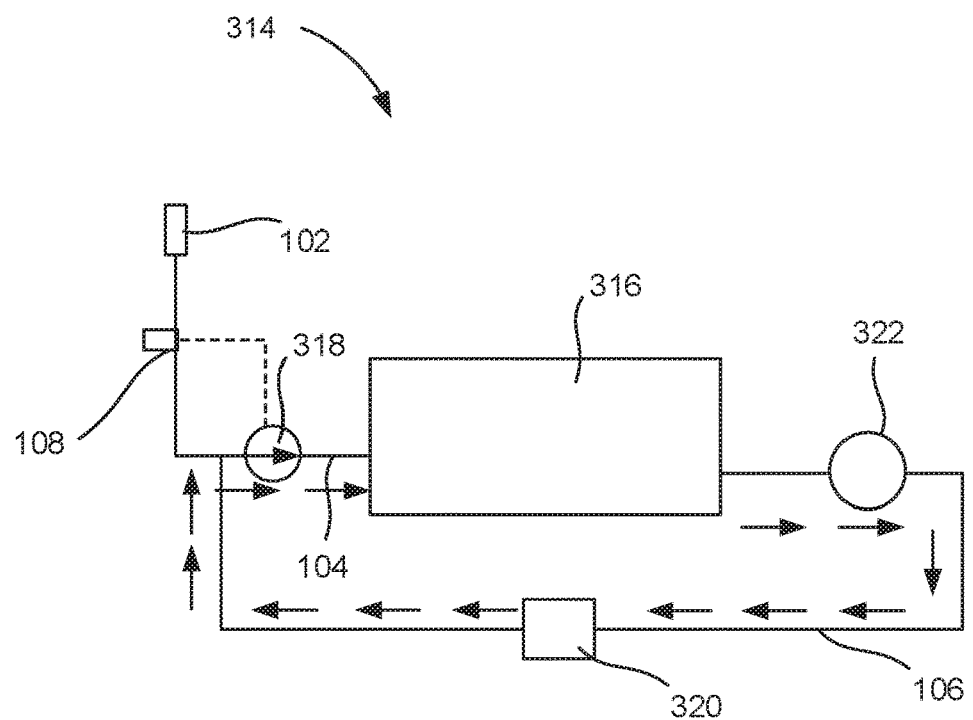

Accordingly, the switch (108) is a component that responsive to a removal of the removable extraction reservoir, may prevent such leakage. Specifically, responsive to the removal of the removable extraction reservoir, the switch activates a fill pump. Doing so draws the fluid through the supply line (104) but away from the interface (102) and the removable extraction reservoir. That is, one end of the supply line (104) is coupled to the removable extraction reservoir and the other end is coupled to the reservoir. The return line (106) joins the supply line (104) upstream of the fill pump. Accordingly, activating the fill pump draws fluid through the supply line (104) but towards the reservoir and away from the removable extraction reservoir. FIGS. 3A and 3B depict such an example.

As will be described below, the toggling of the switch (108) may trigger other actions. Specifically, toggling of the switch (108) to an active state, such as when a removable extraction reservoir is inserted, may open a return line valve. In this example, toggling of the switch (108) to an inactive state, such as when the removable extraction reservoir is removed, may close the return line valve and/or turn off the recirculation pump.

In some examples, the switch (108) may be a mechanical device. For example, insertion/removal of the removable extraction reservoir may physically alter the position of a mechanical switch (108). A sensor can detect what position the switch (108) is in and may alter operation of the fill pump accordingly. In another example, the switch (FIG. 1, 108) may be an electronic component. That is, the switch (FIG. 1, 108) may be sensor, such as an optical sensor to detect when a removable extraction reservoir is or is not in place.

As described above, the switch (108) may be located in the interface (102) where the removable extraction reservoir is to be received. In this fashion, the switch (108) may be acted upon by insertion of the removable extraction reservoir into the interface (102).

Thus, the present fluid extraction system (100) relies on a switch (108) to determine when and when not to activate a fill pump to draw fluid away from the interface (102)/ removable extraction reservoir. Doing so ensures that when a removable extraction reservoir is not in the interface (102), no fluid can be passed to the interface (102). Thus, leakage out the return line (106) at the interface (102) is prevented.

FIG. 2 is an isometric view of a printing device (210) with a fluid extraction system (FIG. 1, 100) for fluid extraction using fill pump activation, according to an example of the principles described herein. In this example, the fluid extraction system (FIG. 1, 100) includes the removable extraction reservoir (212) to which the fluid is extracted. As described above, the removable extraction reservoir (212) has a corresponding interface that mates with the interface (102) of the fluid extraction system (FIG. 1, 100) such that fluid can be transferred between the printing device (210) and the removable extraction reservoir (212).

The removable extraction reservoir (212) refers to a device that holds fluid. The fluid may be any type including ink for 2D printing and/or an additive manufacturing fabrication agent. The removable extraction reservoir (212) may take many forms. For example, the removable extraction reservoir (212) may include a pliable reservoir that conforms to the contents disposed therein. Because a pliable reservoir is difficult to handle and manipulate, it may be disposed in a rigid container, for example a corrugated fiberboard carton.

The removable extraction reservoir (212) may include channels and openings to facilitate the extraction of the fluid, and in some examples delivery of fluid, from the printing device (210). In some examples, the opening to the removable extraction reservoir (212) may have a port or closing such that when the removable extraction reservoir (212) is not disposed in a printing device (210), the fluid therein does not leak out.

The removable extraction reservoir (212) also includes an electrical connection to establish a data transmission path between the removable extraction reservoir (212) and the printing device (210).

As described above, the interface (102) mates with an interface on the removable extraction reservoir (212). For example, the interface (102) may include a needle to be inserted into a removable extraction reservoir (212). The needle may be hollow and allow fluid to pass there through. The needle may pierce a septum on the removable extraction reservoir (212) and be put in fluidic communication with contents of the removable extraction reservoir (212). In another example, a valve or gasket may be present on the removable extraction reservoir (212) and the needle may pass through the valve or gasket.

Upon insertion, a component of the removable extraction reservoir (212) operates against the switch (FIG. 1, 108). For example, protrusions on the removable extraction reservoir (212), if they match keyed slots, press against the switch (FIG. 1, 108) to toggle the opening and closing of the return line valve.

In some examples, the printing device (210) may include multiple interfaces (102), with each interface (102) being uniquely keyed to a removable extraction reservoir (212) with different characteristics, such as different colors. For simplicity of illustration, a single removable extraction reservoir (212) is depicted as being coupled to the printing device (210). However, the fluidic extraction system (FIG. 1, 100) may be able to extract fluid from multiple internal reservoirs to multiple removable extraction reservoirs (212).

FIGS. 3A and 3B are diagrams of a fluid transport system (314) for fluid extraction using fill pump activation, according to an example of the principles described herein. Specifically, FIG. 3A is a diagram of the fluid transport system (314) during fluid extraction and FIG. 3B is a diagram of the fluid transport system (314) following fluid extraction when the removable extraction reservoir (212) has been removed.

The fluid transport system (314) includes a reservoir (316). As described above, the reservoir (316) may be internal to a printing device (FIG. 2, 210) and may hold different types of fluid. For example, the reservoir (316) may hold an ink used in 2D printing. In another example, the reservoir (316) holds a fusing agent in a 3D printing process. In some examples, a printing device (FIG. 2, 210) may have multiple reservoirs (316). Accordingly, each reservoir (316) may correspond to a different fluid transport system (314).

The fluid transport system (314) also includes the fluid extraction system (FIG. 1, 100). As described above, the fluid extraction system (FIG. 1, 100) includes an interface (102) as described above to receive a removable extraction reservoir (212). The interface (102) may include components such as a needle to be inserted into the removable extraction reservoir (212) to facilitate fluid transport and electrical connections to facilitate data transmission. In some examples, the interface (102) includes keying features to gate insertion of a particular type of removable fluid reservoir (212).

FIGS. 3A and 3B also depict the supply line (104) through which fluid is supplied to the reservoir (316). That is, in addition to receiving fluid from the reservoir (316), the removable extraction reservoir (212), or another refill reservoir, may be placed at the interface (102) to refill reservoir (316). In other words, the supply line (104) connects the interface (102) to the reservoir (316) and delivers fluid to the reservoir (316) from the removable extraction reservoir (212) during a refill operation. However, during a fluid extraction operation, fluid may flow through a portion of the supply line (104) in the reverse direction towards the removable extraction reservoir (212).

The fluid transport system (314) also includes a fill pump (318). This fill pump (318) draws fluid from the removable extraction reservoir (212) to the reservoir (316) through the supply line (104). As depicted in FIGS. 3A and 3B, the return line (106) is coupled to the supply line (104) between the interface (102) and the fill pump (318).

FIGS. 3A and 3B also clearly depict the return line (106) that connects the reservoir (316) and the supply line (104) and that transports fluid from the reservoir (316) to the removable extraction reservoir (212). In some examples, the return line (106) is coupled at one end to the reservoir (316) and at the other end to the supply line (104). Thus, during extraction, fluid flows from the reservoir (316) through the return line (106) and eventually to the supply line (104).

FIGS. 3A and 3B also depict components found on the return line (106) that operate to open and close fluid flow through the return line (106). Specifically, the fluid extraction system (FIG. 1, 100) may include a return line valve (320) disposed along the return line (106) and a recirculation pump (322). In some examples, the recirculation pump (322) may be used to recirculate fluid through a printhead coupled to the reservoir (316). During an extraction operation this recirculation pump (322) may be used to direct fluid through the return line (106).

As described above, the fluid extraction system (FIG. 1, 100) includes a switch (108) that may be acted upon by the insertion/removal of the removable extraction reservoir (212). That is, the insertion/removal of the removable extraction reservoir (212) may displace the switch (108). A sensor may detect the movement of the switch (108). In some examples, the switch (108) directly activates/deactivates the fill pump (318). For example, removal of the removable extraction reservoir (212) may trigger sending of a signal directly to the fill pump (318) to activate to facilitate fluid flow through the supply line (104).

A description of the various states of the fluid extraction system (FIG. 1, 100) will now be presented. Specifically, in FIG. 3A, the removable extraction reservoir (212) is inserted into an interface (102) of the printing device (FIG. 2, 210). Accordingly, the switch (108) is engaged. At some point in time a fluid extraction operation is initialized. That is, fluid is drawn from the reservoir, through the return line (106), and to the removable extraction reservoir (212). Due to the effect of the fill pump (318) being off, and thereby closed, fluid does not re-flow towards the reservoir (316) but instead is entirely directed to the removable extraction reservoir (212).

FIG. 3B depicts the fluid transport system (314) in a state when the removable extraction reservoir (212) has been removed. Immediately upon removal, the switch (108) is disengaged. In this example, the fill pump (318) is immediately activated. As depicted above, the return line (106) is coupled to the supply line (104) between the interface (102) and the fill pump (318). Accordingly, during a fluid extraction operation, because the fluid pump (318) is closed, fluid naturally flows towards the removable extraction reservoir (212). However, upon activation of the fill pump (318), fluid is drawn away from the removable extraction reservoir (212) and towards the reservoir (316). Thus, any remaining fluid in the return line (104) or fluid that continues to be drawn by the recirculation pump (322) prior to its shut off, does not pass to the interface (102) to be spilled out, but instead passes back to the reservoir (316) to be contained therein. Thus, the present fluid transport system (314) can extract fluid from a reservoir (316) while preventing spillage.

Figure 4:
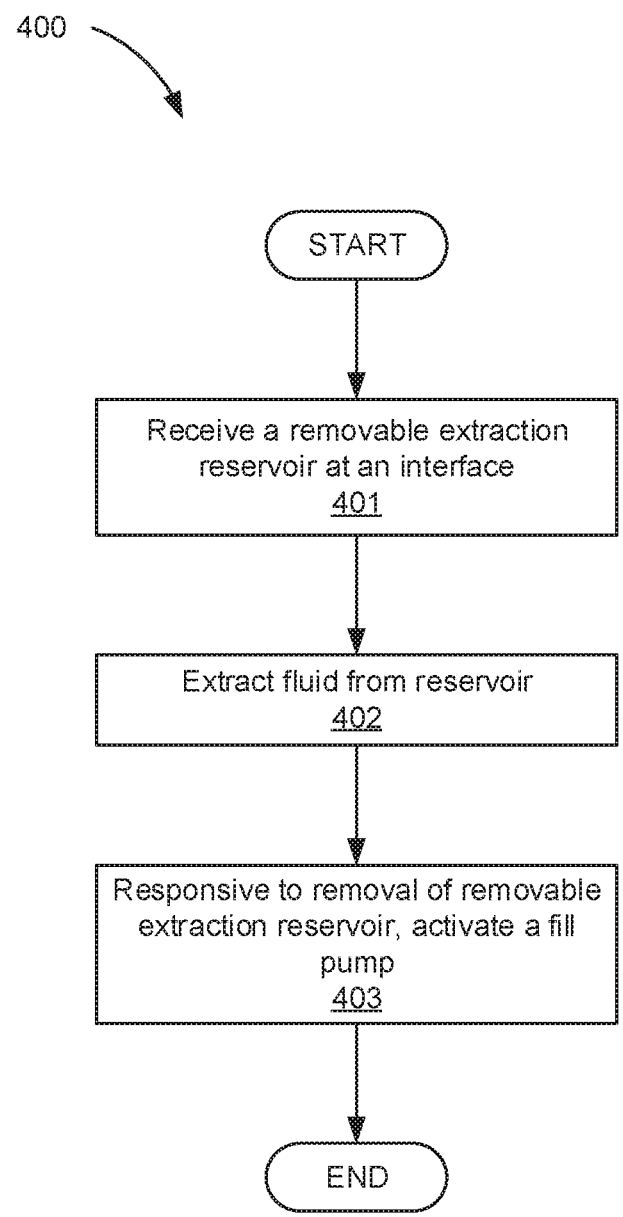
FIG. 4 is a flowchart of a method for extracting fluid to a removable extraction reservoir, according to an example of the principles described herein.

FIG. 4 is a flowchart of a method (400) for extracting fluid to a removable extraction reservoir (FIG. 2, 212), according to an example of the principles described herein. According to the method (400), a removable extraction reservoir (FIG. 2, 212) is received (block 401) at an interface (FIG. 1, 102). As described above, the interface (FIG. 1, 102) is a component of a fluid extraction system (FIG. 1, 100) that provides a mechanical, electrical, and fluidic connection between an inserted removable extraction reservoir (FIG. 2, 212) and a reservoir (FIG. 3A, 316) of a printing device (FIG. 2, 210). That is, the interface (FIG. 1, 102) may mechanically retain the removable extraction reservoir (FIG. 2, 212) to the printing device (FIG. 2, 210) in which the fluid extraction system (FIG. 1, 100) is disposed. The interface (FIG. 1, 102) also includes electrical connections that mate with corresponding connections on the removable extraction reservoir (FIG. 2, 212) such that a data transmission path is established. The interface (FIG. 1, 102) also includes a needle or other component that pierces a septum or is otherwise inserted into the removable extraction reservoir (FIG. 2, 212). Through such a needle, fluid can be deposited into the removable extraction reservoir (FIG. 2, 212) or drawn from the removable extraction reservoir (FIG. 2, 212). A switch (FIG. 1, 108) is also disposed in the interface (FIG. 1, 102) such that upon reception/removal of a removable extraction reservoir (FIG. 2, 212) the switch (FIG. 1, 108) toggles. Fluid is then extracted (block 402) from the reservoir (FIG. 3A, 316) to the removable extraction reservoir (FIG. 2, 212).

At some point in time, the removable extraction reservoir (FIG. 2, 212) is removed. This may be before an extraction operation is complete, for example by a user intentionally or inadvertently taking out the removable extraction reservoir (FIG. 2, 212) before the extraction operation is complete. During the extraction operation, the recirculation pump (FIG. 3A, 322) may be active and the user may remove the removable extraction reservoir (FIG. 2, 212) prior to the shutdown of the recirculation pump (FIG. 3A, 322). Accordingly, there may be a period of time when the removable extraction reservoir (FIG. 2, 212) is not in place, but the recirculation pump (FIG. 3A, 322) is actively pumping. This may result in fluid being expelled at the interface (FIG. 1, 102) where the removable extraction reservoir (FIG. 2, 212) previously sat.

In another example, the fluid extraction process may have terminated, and the recirculation pump (FIG. 3A, 322) is turned off when the removable extraction reservoir (FIG. 2, 212) is removed. However, due to pressure differentials and other fluid dynamics, a bit of fluid, for example that fluid remaining in the return line (FIG. 1, 106) following deactivation of the recirculation pump (FIG. 3A, 322), may still be drawn out of through the interface (FIG. 1, 102). In either case, the fluid flow may result in spilt fluid within the interface (FIG. 1, 102) which is messy, wasteful, and may potentially get on a user.

Accordingly, responsive to removal of the removable extraction reservoir (FIG. 2, 212), the fill pump (FIG. 3A, 318) is activated (block 403). That is, the switch (FIG. 1, 106) in the interface (FIG. 1, 106) may move position on account of the removal of the removable extraction reservoir (FIG. 2, 212). The movement of the switch (FIG. 1, 106) is detected by the system and the switch (FIG. 1, 106) sends a signal, either directly or through a controller, to the fill pump (FIG. 3A, 318) to turn on for a period of time such that any fluid that would flow out of the interface (FIG. 1, 102) is instead drawn back to the reservoir (FIG. 3A, 316). Such a method (400) thereby allows for the controlled and secure transportation of fluid from a printing device (FIG. 2, 210) to a removable extraction reservoir (FIG. 2, 212) all while preventing any leakage of extracted fluid.

Figure 5A:
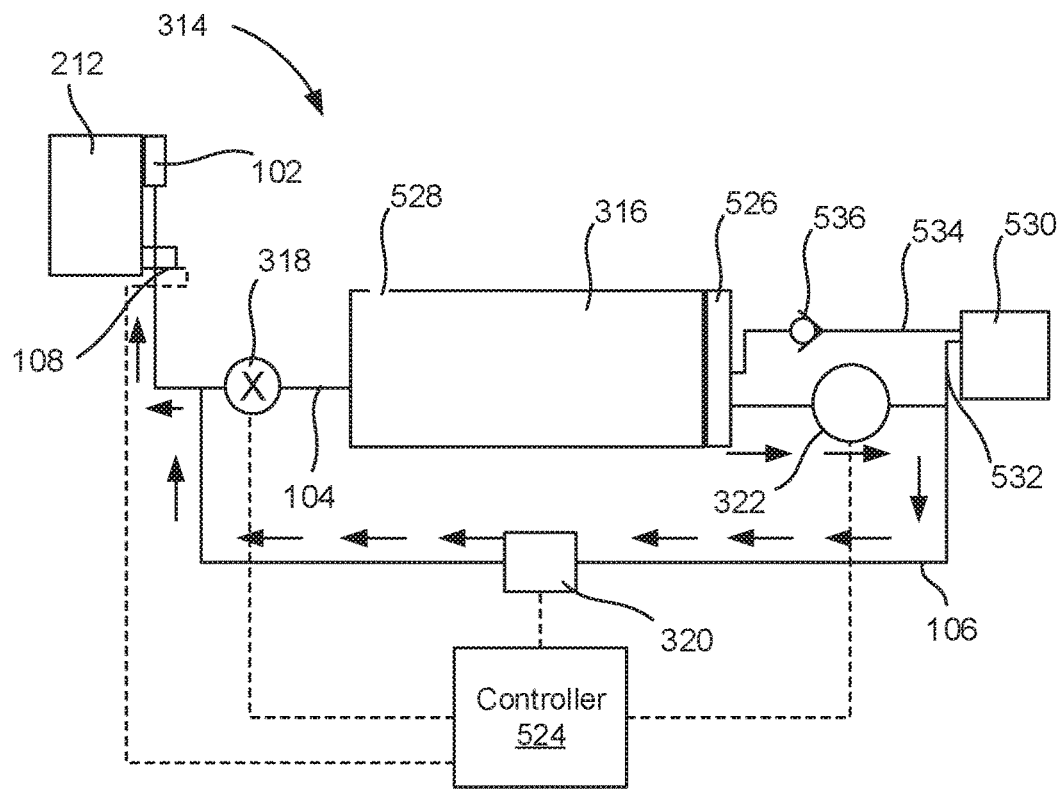
FIGS. 5A and 5B are diagrams of a fluid transport system for fluid extraction using fill pump activation, according to another example of the principles described herein.
Figure 5B:
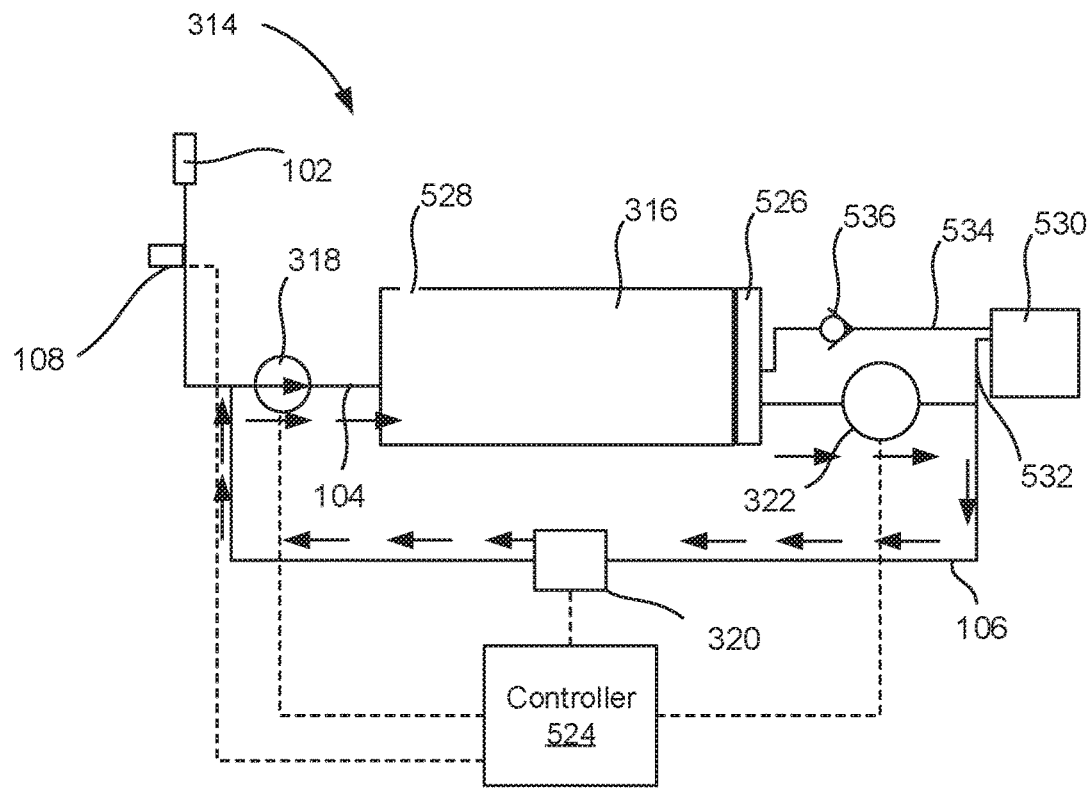

FIGS. 5A and 5B are diagrams of a fluid transport system (314) for fluid extraction using fill pump activation, according to another example of the principles described herein. Specifically, FIG. 5A is a diagram of the fluid transport system (314) during fluid extraction and FIG. 5B is a diagram of the fluid transport system (314) following removal of the removable extraction reservoir (212). FIGS. 5A and 5B depict certain components depicted in FIGS. 3A and 3B such as the supply line (104), fill pump (318), reservoir (316), recirculation pump (322), return line (106), return line valve (320), interface (102), and switch (108).

FIGS. 5A and 5B also depict other components. For example, in this case, the fluid transport system (314) includes a controller (524) that controls operation of certain components. In this example, rather than the switch (108) being coupled directly to the fill pump (318), the switch (108) is coupled to the controller (524) which activates/deactivates the fill pump (318). The controller (524) also controls other components of the fluid transport system (314) such as the recirculation pump (322) and the return line valve (320). The control of these components may or may not be responsive to the toggling of the switch (108).

FIGS. 5A and 5B also depict a fluid level sensor (526) and a vent assembly (528). The fluid level sensor (526) is disposed on, or in, the reservoir (316) and defines when to terminate a fluid delivery operation. That is, the fluid level sensor (526) may indicate when the reservoir (316) is full, such that a reservoir (316) fill operation may be terminated. In another example, the fluid level sensor (526) may indicate when the reservoir (316) is empty, such that a fluid extraction operation may be terminated.

In some examples, the reservoir (316) includes a vent assembly (528) (and may include more in some implementations). During printing, the vent assembly (528) allows air to enter to prevent the formation of a vacuum. The vent assembly (528) also allows air to exit during refill to prevent over-pressuring the reservoir (316). The vent assemblies (528) may also be used to allow pressure relief when the reservoir (316) has been over-pressured.

FIGS. 5A and 5B also depict the printhead (530) from which fluid is ejected. That is, the printhead (530) may include various ejecting components that include chambers where a small amount of fluid is held. The controller (524) or another controller then activates at particular times to eject fluid from the chambers through an opening in a desired pattern. In this fashion, fluid is deposited on a substrate in a desired pattern in 2D printing, 3D printing, or another ejection operation.

FIGS. 5A and 5B also depict a pressure control device (536) disposed along a printhead return line (534). The pressure control device (536) ensures a desirable pressure differential in the printhead (530) during fluid deposition.

As depicted in FIGS. 5A and 5B, the return line (106) is coupled to the printhead line (532) that delivers fluid from the reservoir (316) to the printhead (530). During extraction, fluid is prevented from traveling through the printhead line (532) and the printhead return line (534) due to the fluid mechanics of those lines. That is, the printhead return line (534) may maintain a pressure that is greater than the pressure through the return line (106). Thus, the return line (106) presents a fluidic path with less fluidic resistance. Thus, during a fluid extraction process, fluid flows through the return line (106).

A description of the various states of the fluid transport system (FIG. 1, 100) will now be presented. Specifically, in FIG. 5A, the removable extraction reservoir (212) is inserted into the interface (102) of the printing device (FIG. 2, 210). Accordingly, the switch (108) is engaged. In some examples, engaging the switch (108) may have no effect on the activation/deactivation of the fill pump (318), but may have other actions. For example, this engagement triggers the controller (524) to open the return line (106). Specifically, responsive to insertion of the removable extraction reservoir (212), the recirculation pump (322) may be activated and the return line valve (320) may be opened. In other examples, one or both of these components may be activated independent of the operation of the switch (108). In either case, the return line (106) is opened such that fluid may flow from the reservoir (316) to the removable extraction reservoir (212). Due to the effect of the fill pump (318) being off, and thereby closed, fluid does not re-flow towards the reservoir (316) but instead is entirely directed to the removable extraction reservoir (212). Due to the effect of the high pressure printhead return line (534) and the pressure control device (536) fluid does not flow towards the printhead (530), but instead is directed through the return line (106).

FIG. 5B depicts the fluid transport system (314) in a state when the removable extraction reservoir (212) has been removed. Immediately upon removal of the removable extraction reservoir (212), the switch (108) is disengaged. In this example, the controller (524) activates the fill pump (318) such that any fluid remaining in the return line (106) or that enters the return line (106) following removal of the removable extraction reservoir (212) does not pass to the interface (102), but is rather drawn to the reservoir (316). After a predetermined period of time, the controller (524) deactivates the fill pump (318). For example, after a predetermined period of time, the recirculation pump (322) may be turned off such that it is no longer pumping fluid through the return line (106). At this point in time, the fill pump (318) may no longer be needed to draw fluid away from the interface (102). Accordingly, the controller (524) may shut down the fill pump (318) so as to conserve energy.

In addition to activating the fill pump (318), the controller may take other actions responsive to a removal of the removable extraction reservoir (212). Specifically, the controller (524) may close the return line (106) by deactivating the recirculation pump (322) and closing the return line valve (320).

Figure 6A:
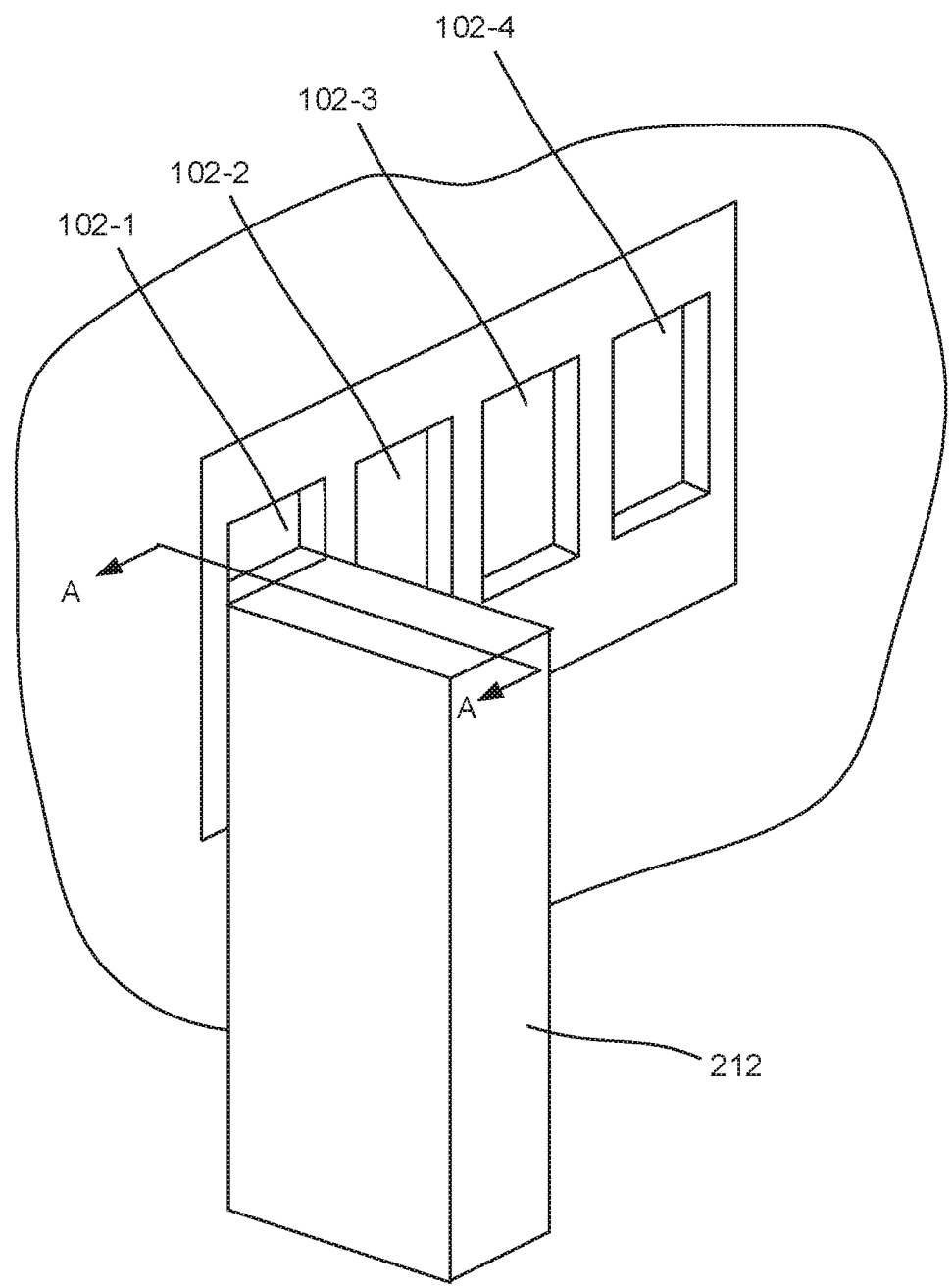
FIGS. 6A-6C are diagrams of a switch of the fluid extraction system, according to an example of the principles described herein.
Figure 6B:
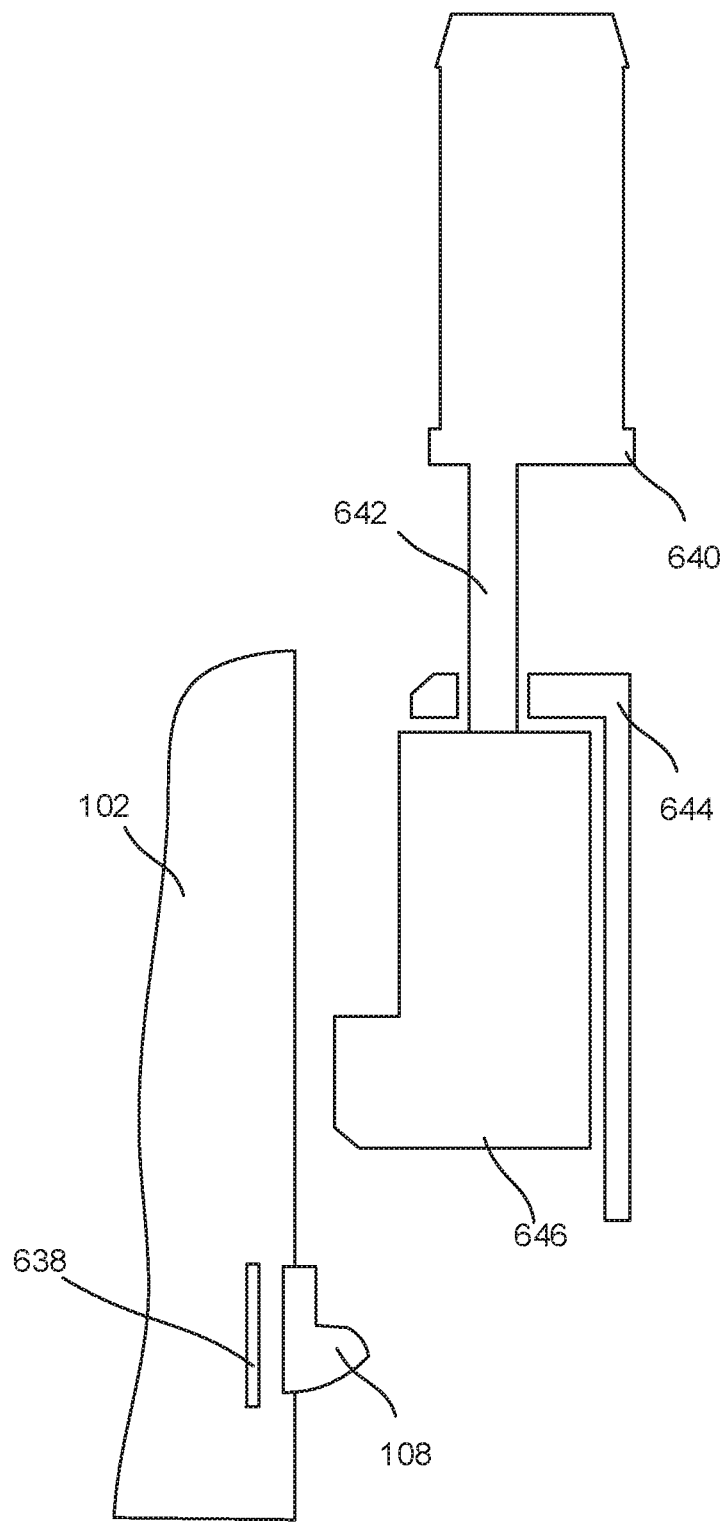
Figure 6C:
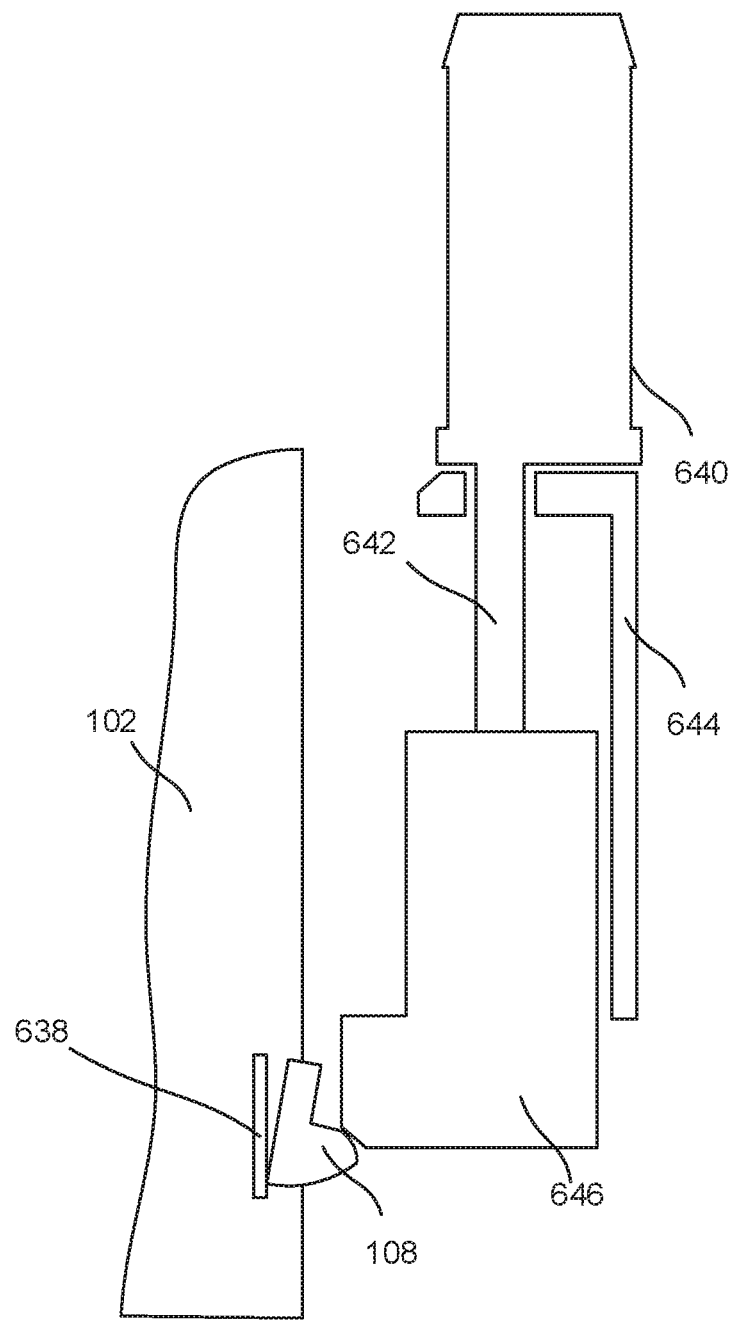

FIGS. 6A-6C are diagrams of a switch (FIG. 1, 108) of the fluid extraction system (FIG. 1, 100), according to an example of the principles described herein. Specifically, FIG. 6A depicts a removable extraction reservoir (212) disposed in an interface (102) of the printing device (FIG. 2, 210). As depicted in FIG. 6A, a printing device (FIG. 2, 210) may include multiple interfaces (102-1, 102-2, 102-3, 102-4), each to receive a different refill or removable extraction reservoir (212). For example, each interface (102) may correspond to a different color.

FIGS. 6B and 6C are cross-sectional diagrams taken along the line A-A in FIG. 6A. Specifically, FIG. 6B depicts a cross-sectional diagram before the switch (108) is engaged and FIG. 6C depicts a cross-sectional diagram after the switch (108) is engaged. FIG. 6B depicts a protrusion (640) that may be formed on a part of the removable extraction reservoir (FIG. 2, 212) that is inserted into the interface (102). It is this protrusion (640) that toggles the switch (108). Note that when a removable extraction reservoir (FIG. 2, 212) is not inserted as depicted in FIG. 6B, the switch (108) is biased away from a contact surface (638) such as a printed circuit board.

In some examples, the removable extraction reservoir (FIG. 2, 212) is uniquely paired with a particular interface (102). That is, the protrusion (640) may include a key (642) with a size and shape to match a key slot (644) in the interface (102). Accordingly, if the key (642) size and shape match the key slot (644), the key (642) passes through and contacts a plunger (646) in the interface (102). Accordingly, during insertion, a user continues to push on the removable extraction reservoir (FIG. 2, 212) until the plunger (646) interfaces with the switch (108) as depicted in FIG. 6C.

Note that as the plunger (646) contacts the switch (108), the switch (108) is pivotally coupled to the interface (102) such that it swings. In so doing, the switch (108) contacts the contact surface (638). Contact, or lack thereof, with the contact surface (638) can be detected and converted into a fill pump (FIG. 3A, 318) control signal. For example, when contact is determined, the fill pump (FIG. 3A, 318) may not be activated. However, the change from a contact state to a non-contact state may result in the activation of the fill pump (FIG. 3A, 318).

Figure 7:
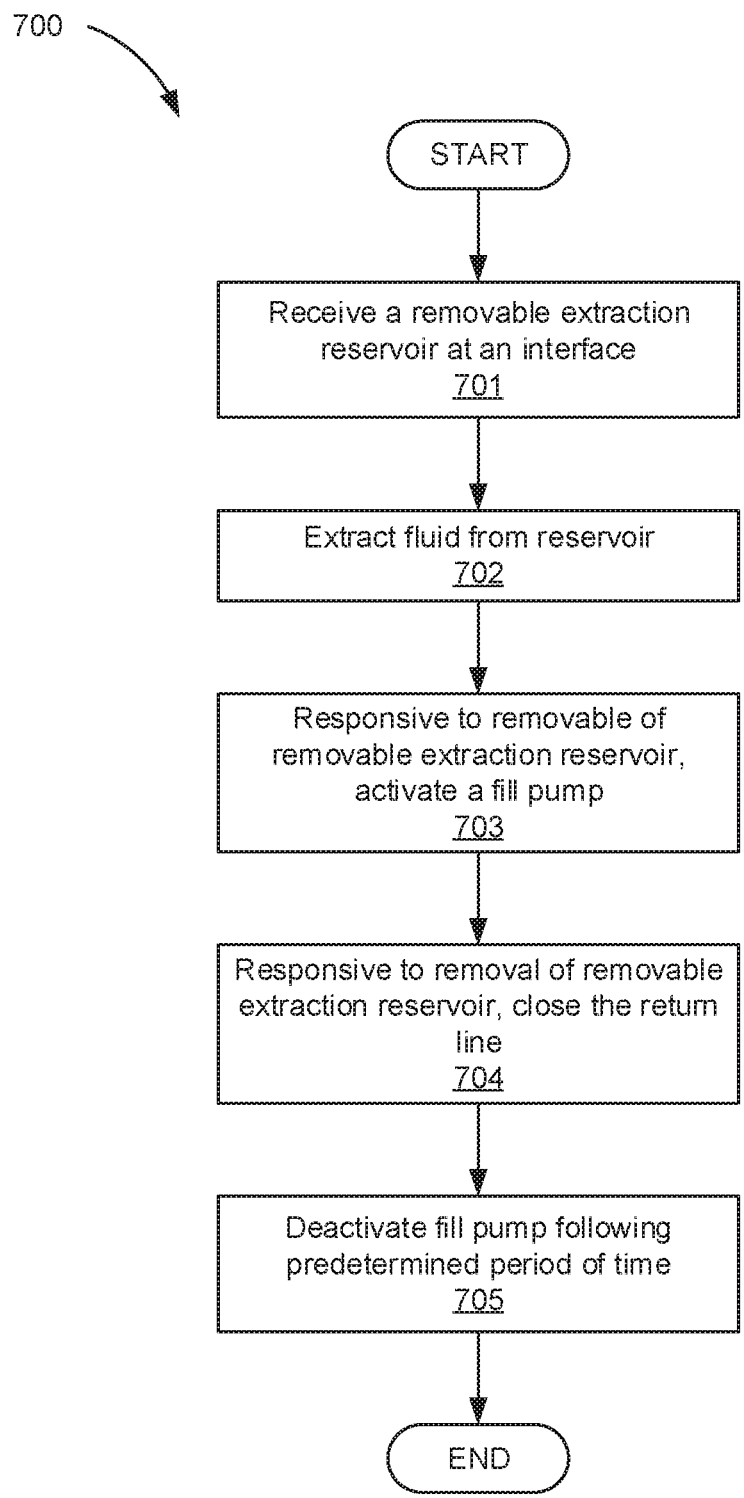
FIG. 7 is a flowchart of a method for extracting fluid to a removable extraction reservoir, according to an example of the principles described herein.

FIG. 7 is a flowchart of a method (700) for extracting fluid to a removable extraction reservoir (FIG. 2, 212), according to an example of the principles described herein. According to the method (700), a removable extraction reservoir (FIG. 2, 212) is received (block 701) at an interface (FIG. 1, 102) and fluid is extracted (block 702) from the reservoir (FIG. 3A, 316). In some examples, this may be performed as described above in connection with FIG. 4.

Responsive to removal of the removable extraction reservoir (FIG. 2, 212), the fill pump (FIG. 3A, 318) may be activated (block 703). Doing so draws fluid away from the interface (FIG. 1, 102) where the removable extraction reservoir (FIG. 2, 212) is no longer in place to catch extracted fluid. Rather, the fluid is drawn to another container, the reservoir (FIG. 3A, 316), where it is held. As described above, in some examples, other actions may be taken responsive to the removal of the removable extraction reservoir (FIG. 2, 212). For example, responsive to removal of the removable extraction reservoir (FIG. 2, 212), the return line (FIG. 1, 106) may be closed (block 704), specifically by closing the return line valve (FIG. 3A, 320) and deactivating the recirculation pump (FIG. 3A, 322). However, in other examples, the closing of the return line (FIG. 1, 106) may not be responsive to removal of the removable extraction reservoir (FIG. 2, 212) but may be independently controlled by the controller (FIG. 5, 524).

Once pressure residuals have normalized and/or other components of the fluid extraction system (FIG. 1, 100) have been configured to restrict fluid flow, the fill pump (FIG. 3A, 318) may be deactivated (block 705) following a predetermined period of time. Deactivation (block 705) of the fill pump (FIG. 3A, 318) conserves power when its activity to draw fluid away from the interface (FIG. 1, 102) is no longer necessary.

Such a fluid extraction system may 1) prevent disposal of otherwise usable fluid disposed within an out-of-contract/non-functioning printing device; 2) reduce financial exposure for fluid suppliers as they can reclaim fluid dispensed in an out-of-contract/non-functioning printing device; 3) prevent printing device failure due to ink drying out during long term storage; 4) reduce service cost and complexity; 5) prevent re-fill with unauthorized fluid; 6) allow printing device recyclability without fluid in reservoir; 7) enable extraction from a single reservoir; 8) enable secure reclamation and refilling of ink; and 9) prevents fluid spillage during/after fluid extraction due to removal of a removable extraction reservoir.

What is claimed is:

1. A fluid extraction system comprising:
   an interface to fluidically and electrically couple a removable extraction reservoir to a printing device;
   a supply line to transport fluid from the interface to a reservoir of the printing device;
   a return line coupled to the reservoir and the supply line to transport fluid from the reservoir to the interface; and
   a switch to, responsive to removal of the removable extraction reservoir from the printing device, activate a fill pump to draw fluid through the supply line away from the interface.

2. The fluid extraction system of claim 1, wherein the fill pump is to draw fluid through the supply line to the reservoir.

3. The fluid extraction system of claim 1, wherein the switch is to send a signal to a controller to activate the fill pump.

4. The fluid extraction system of claim 3, wherein the controller is to deactivate the fill pump a predetermined amount of time following removal of the removable extraction reservoir.

5. The fluid extraction system of claim 1, wherein the switch is to directly control the fill pump.

6. The fluid extraction system of claim 1, wherein the switch:
   responsive to attachment of the removable extraction reservoir to the printing device, is to open the return line to direct fluid from the reservoir to the interface; and
   responsive to removal of the removable extraction reservoir from the printing device, is to close the return line.

7. The fluid extraction system of claim 6, wherein opening the return line comprises:
   activating a recirculation pump to draw fluid through the return line; and
   opening a return line valve.

8. The fluid extraction system of claim 6, wherein closing the return line comprises:
   deactivating the recirculation pump; and
   closing the return line valve.

9. A fluid transport system comprising:
   a reservoir to hold an amount of fluid;
   an interface to fluidically couple a removable extraction reservoir to a printing device;
   a supply line to connect the interface and the reservoir;
   a fill pump to draw fluid to the reservoir;
   a return line to connect the reservoir to the supply line between the interface and the fill pump, and to transport fluid from the reservoir to the interface;
   a return line valve disposed along the return line to open and close the return line;
   a switch to, responsive to removal of the removable extraction reservoir from the printing device, activate the fill pump to draw fluid through the supply line away from the interface; and
      a recirculation pump to, during an extraction operation, move fluid from the reservoir to the interface.

10. The fluid transport system of claim 9, further comprising:
   a fluid level sensor disposed in the reservoir;
   a vent assembly disposed on the reservoir;
   a pressure control device disposed along a printhead return line;
   or a combination thereof.

11. The fluid transport system of claim 9, wherein the return line is in fluid communication with a printhead line that delivers fluid to a printhead.

12. A method comprising:
   receiving, at an interface of a printing device, a removable extraction reservoir;
   extracting fluid from the reservoir to the removable extraction reservoir; and
   responsive to removal of the removable extraction reservoir, activating a fill pump to draw fluid through the supply line away from the removable extraction reservoir.

13. The method of claim 12, further comprising, deactivating the fill pump following a predetermined period of time following removal of the removable extraction reservoir.

14. The method of claim 12, further comprising, responsive to removal of the removable extraction reservoir, closing a return line valve.

15. The method of claim 12, further comprising, responsive to removal of the removable extraction reservoir, deactivating a recirculation pump.

\* \* \* \* \*